United States Patent
Williams et al.

(10) Patent No.: US 9,969,265 B2
(45) Date of Patent: May 15, 2018

(54) FUEL DOOR STATUS INDICATING SYSTEM FOR PRESSURIZED FUEL SYSTEM

(71) Applicant: Toyota Motor Engineering & Manufacturing North America, Inc., Erlanger, KY (US)

(72) Inventors: Paxton S. Williams, Milan, MI (US); Paul E. Harmon, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days. days.

(21) Appl. No.: 15/155,996

(22) Filed: May 16, 2016

(65) Prior Publication Data
US 2017/0326982 A1    Nov. 16, 2017

(51) Int. Cl.
| | |
|---|---|
| *B60K 35/00* | (2006.01) |
| *B60K 15/05* | (2006.01) |
| *B60Q 9/00* | (2006.01) |
| *E05B 81/70* | (2014.01) |
| *E05B 83/34* | (2014.01) |
| *G01L 19/08* | (2006.01) |
| *B60C 9/00* | (2006.01) |

(52) U.S. Cl.
CPC ............... *B60K 35/00* (2013.01); *B60C 9/00* (2013.01); *B60K 15/05* (2013.01); *E05B 81/70* (2013.01); *E05B 83/34* (2013.01); *G01L 19/086* (2013.01); *B60K 2015/0561* (2013.01); *B60K 2350/924* (2013.01)

(58) Field of Classification Search
CPC ...................................................... B06K 35/00
See application file for complete search history.

(56) References Cited

U.S. PATENT DOCUMENTS

| | | | |
|---|---|---|---|
| 8,667,922 B2 | 3/2014 | Demmer | |
| 9,216,646 B2 | 12/2015 | Yang et al. | |
| 2006/0167745 A1* | 7/2006 | Wiethorn | G06Q 30/02 705/14.67 |
| 2007/0118423 A1* | 5/2007 | Always | G06Q 30/02 705/14.62 |
| 2013/0121010 A1* | 5/2013 | McClendon | G09F 13/04 362/520 |
| 2014/0026865 A1* | 1/2014 | Dudar | F02M 25/0818 123/518 |
| 2014/0026992 A1 | 1/2014 | Pearce et al. | |

(Continued)

FOREIGN PATENT DOCUMENTS

EP    2093089 A1    8/2009

*Primary Examiner* — Pameshanand Mahase
(74) *Attorney, Agent, or Firm* — Christopher G. Darrow; Darrow Mustafa PC (57) ABSTRACT

A fuel door status indicating system for a pressurized fuel system is provided. The status indicating system includes pressure sensing means configured to measure a pressure in the fuel system, a controller operatively connected to the pressure sensing means and configured to compare a measured fuel-system pressure with a predetermined pressure, and a display operatively connected to the controller and configured to provide an indication as to whether the fuel door may be opened. The controller is configured to control operation of the display to provide the indication responsive to the comparison of the measured pressure with the predetermined pressure.

17 Claims, 6 Drawing Sheets

(56) References Cited

U.S. PATENT DOCUMENTS

| | | | |
|---|---|---|---|
| 2014/0374177 A1* | 12/2014 | Yang | B60K 15/035 180/65.21 |
| 2015/0032307 A1* | 1/2015 | Lindlbauer | B60K 15/035 701/22 |
| 2015/0121999 A1* | 5/2015 | Dudar | F02D 41/221 73/114.39 |
| 2015/0375673 A1* | 12/2015 | Testai | B60Q 1/268 362/545 |

* cited by examiner

FUEL DOOR STATUS INDICATING SYSTEM FOR PRESSURIZED FUEL SYSTEM

TECHNICAL FIELD

The present invention relates to indicators for vehicle fuel system status and, more particularly, to a fuel door status indicating system for a pressurized fuel system.

BACKGROUND

Some vehicles (especially hybrid vehicles) incorporate fuel systems which are pressurized during operation of the vehicle. Prior to refueling of these vehicles, the fuel system pressure must be reduced to (or below) a predetermined level, so that the fuel cap may be removed without the possibility of fuel ejecting from the fuel tank. In some systems, to prevent access to the fuel cap prior to sufficient fuel system depressurization, a locking mechanism may be coupled to the fuel door. The locking mechanism maintains the fuel door in a closed condition until the fuel system is sufficiently depressurized to open the fuel cap.

The fuel door may be opened by a user actuating a button or knob located in the passenger compartment. Actuation of the fuel door release initiates a fuel system depressurization process. When the pressure has fallen to an acceptable level, the fuel door opens automatically or may be opened by the user. However, after actuation of the fuel door release, a user is not aware of how much time will elapse before the fuel door may be opened, the status of the depressurization process, or even if fuel system depressurization is occurring. This may cause user frustration. Also, users unfamiliar with operation of the fuel system may not understand why the fuel door is not opening as soon as the release is actuated. Such users may attempt to open the fuel door manually prior to depressurization, or they may assume that the fuel door release is malfunctioning.

SUMMARY

In one aspect of the embodiments described herein, a fuel door status indicating system for a pressurized fuel system is provided. The status indicating system includes pressure sensing means configured to measure a pressure in the fuel system, a controller operatively connected to the pressure sensing means and configured to compare a measured fuel-system pressure with a predetermined pressure, and a display operatively connected to the controller and configured to provide an indication as to whether the fuel door may be opened. The controller is configured to control operation of the display to provide the indication responsive to the comparison of the measured pressure with the predetermined pressure.

In another aspect of the embodiments of the described herein, a fuel door status indicating system for a pressurized fuel system is provided. The system includes pressure sensing means configured to measure a pressure in the fuel system, and a display operatively connected to the pressure sensing means and configured to provide an indication as to whether the fuel door may be opened. The system is configured such that the display is operated to indicate that the fuel door is ready to open, responsive to a shutting off of the vehicle engine, operation of a fuel door actuator by a user, and detection of a predetermined pressure in the fuel system by the pressure sensing means.

In another aspect of the embodiments of the described herein, a method of providing an indication as to a status of a fuel door of a vehicle incorporating a pressurized fueling system is provided. The method includes steps of determining a pressure within the fuel system, comparing the fuel system pressure to a predetermined threshold pressure and, responsive to the fuel system pressure being at or below the predetermined threshold pressure, operating a display to indicate that the fuel door may be opened.

DETAILED DESCRIPTION

Embodiments of the fuel door status indicating system described herein include a display designed to inform a user as to when a pressurized fuel system has depressurized sufficiently to allow a fuel door to be opened for refueling. Certain embodiments also include a display designed to inform a user as to whether the fuel door has been completely closed after refueling.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
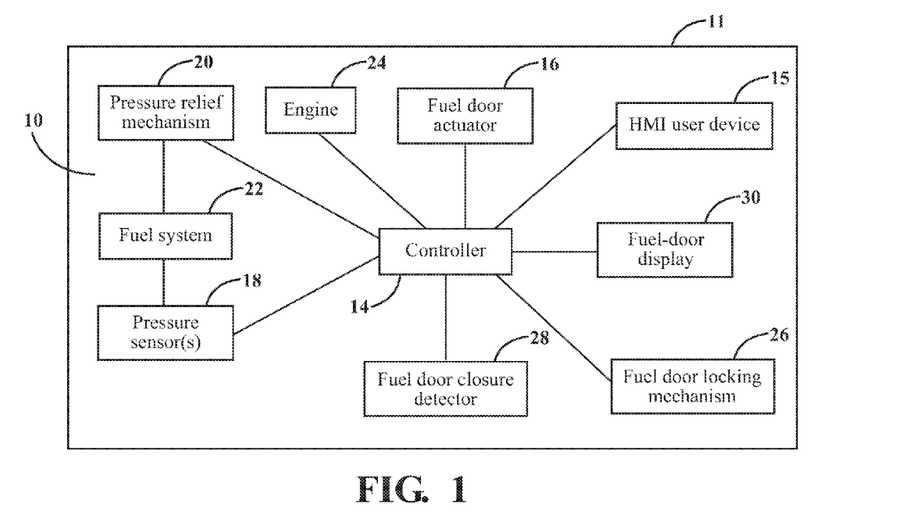
FIG. 1 shows a schematic representation of a vehicle incorporating a fuel-door status indicating system in accordance with an embodiment described herein.

FIG. 1 shows a schematic representation of a vehicle incorporating a fuel-door status indicating system (generally designated 10) in accordance with an embodiment described herein. The system 10 is shown incorporated into a vehicle 11. For purposes described herein, the "status" of a fuel door may be defined as one of "ready to open"; "not ready to open"; "closed" or "fully closed"; or "not closed" or "not fully closed". A status of "closed" is equivalent to a status of "fully closed". Similarly, a status of not closed" is equivalent to a status of "not fully closed". In alternative embodiments, the system 10 may have fewer elements than shown in FIG. 1 and/or alternative or additional elements, depending on the requirements of a particular application.

Figure 1A:
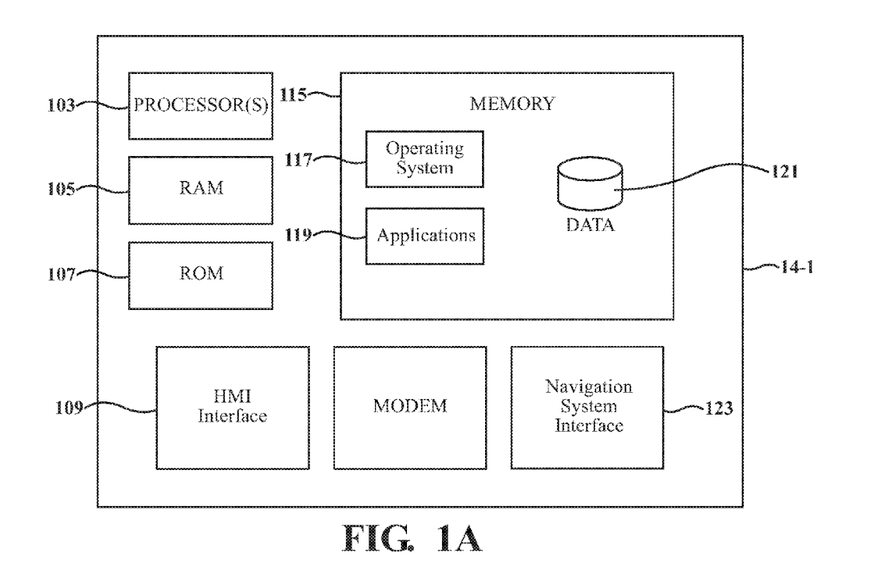
FIG. 1A shows a schematic view of a computing device in accordance with an embodiment described herein.

Referring to FIG. 1, a controller (schematically shown in FIG. 1 as element 14) may be configured for executing the fuel door display and related control functions described herein. In one embodiment, the controller may be embodied in a computing device 14-1 configured to control operation of the fuel door display as described herein. Referring to FIG. 1A, in one embodiment 14-1 of a suitably configured computing device, the device may include one or more processors 103, one or more computer-readable storage(s) or memories 115, hardware and software (collectively labeled 109) supporting an input/output module or human-machine interface (HMI) 15 operatively connected to the computing device, and any other hardware needed to receive and process the inputs described herein, and needed to perform the display control functions described herein.

"Processor" means any component or group of components that are configured to execute any of the processes and/or process steps described herein or any form of instructions to carry out such processes/process steps or cause such processes/process steps to be performed. Computer-readable storage or memory 115 may include any medium that participates in providing data (e.g., instructions), which may be read by a computer. The memory or memories can be a component of the computing device 14-1, or the memory or memories can be operatively connected to the computing device 14-1 for use thereby. The term "operatively connected," as used throughout this description, can include direct or indirect connections, including connections without direct physical contact.

In addition, software may be stored within the one or more memories 115 and/or storage to provide instructions to processor(s) 103 for enabling computing device 14-1 to perform various functions, including the functions described herein and also other functions. For example, memory 115 may store software used by the device 14-1, such as an operating system 117, application programs 119 (including various vehicle system and/or component control functions), and an associated internal database 121. Processor(s) 103 and their associated components may enable the computing device 14-1 to execute a series of computer-readable instructions to receive various inputs and to perform various fuel door related display and control functions and operations, as described herein.

The computing device 14-1 may have some or all of the elements shown in FIG. 1A or fewer elements. In addition, the computing device 14-1 may also include additional components as needed or desired for particular applications. Input/Output (I/O) or HMI support capability 109 may enable the use of a microphone, keypad, touch screen, and/or stylus through which a user of the computing device 14 may provide input, and may also include one or more of a speaker for providing audio output and a video display device for providing textual, audiovisual and/or graphical output from the computing device(s). The HMI user device 15 can be any suitable type of display or other device through which information can be conveyed to a user and/or transmitted by the user to the controller. For instance, the HMI user device 15 can be a liquid crystal display (LCD), a touch-screen, a light emitting diode (LED) display or some other suitable display. In one or more arrangements, the HMI user device 15 can be a heads-up display, a display for a navigation system, and/or a display included in an instrument cluster. The HMI user device 15 can be provided in any suitable location within the vehicle 11.

It will be understood that, although the controller 14 is represented schematically in FIG. 1 as a single device, the fuel-door related functions and operations described herein as being performed by controller 14 may be distributed among (and performed by) multiple computing devices, controller(s), control circuits and/or other elements, arranged in operative communication with each other and operating in a coordinated fashion to perform the desired functions, methods and operations. In this case, the multiple distributed devices (or portions of each device of multiple individual devices) may act in cooperation to effectively operate as a single controller for purposes of performing the one or more of the functions, methods and/or capabilities.

In alternative embodiments (not shown), the controller may be embodied in an electrical circuit configured to operate the fuel door display and perform other functions as described herein. Alternatively, the controller 14 may be embodied in a specialized control circuit incorporated into another controller (not shown) or into another portion of the vehicle. Alternatively, an existing vehicle controller or control module (such as an existing vehicle control module)(not shown) may be operatively coupled to the elements of indicating system 10 as shown and configured to perform the fuel door-related functions and operations described herein.

The fuel door actuator 16 may be located in the vehicle passenger compartment. The actuator 16 may be operatively connected to controller 14 and may be in the form of a rotatable knob, a button, or in any other suitable form. Depressurization of the fuel system to enable refueling will begin after the engine is turned off and the actuator 16 is operated by a user. Operation of the actuator 16 by the user signals the controller 14 that the user is attempting to open the fuel door.

One or more pressure sensor(s) 18 may be provided for determining a pressure in the fuel system. The pressure sensor(s) 18 may include, for example, one or more known pressure sensors positioned and configured for measuring the fuel system pressure at one or more associated locations in the fuel system. Any suitable pressure sensor(s) or other sensing mechanisms may be used. The pressure sensor(s) 18 may be operatively connected to controller 14 so that the controller is constantly apprised of the fuel system pressure.

A pressure relief mechanism (generally designated 20) may be operatively connected to the fuel system 22 and to controller 14. The mechanism 20 may be configured to be operable by controller 14, and may be configured for relieving pressure in the fuel system so that the fuel cap may be removed. The fuel system pressure may be reduced or relieved in a manner known in the art, after shutting off the engine 24 and operating the fuel door actuator 16. For example, a suitable pressure relief valve or other mechanism(s) may be used. In most or all cases, the fuel system 22 will remain pressurized until the engine 24 is off and the fuel door actuator 16 has been operated by a user. If the fuel system pressure has not fallen to a predetermined level, the fuel door (not shown) will remain closed and locked until the predetermined level is reached.

A fuel-door locking mechanism 26 may be operatively coupled to the controller. Fuel-door locking mechanism 26 may be a known locking mechanism adapted or configured to be operable by controller 14 in a manner described herein, using a suitable switch or other actuatable mechanism, for example. In a known manner, closure and locking of the fuel door (not shown) acts to prevent user access to the fuel cap (not shown). Mechanism 26 operates to lock the fuel door and maintain the door in a closed condition until a user operates the fuel door actuator 16 and until the fuel system pressure has fallen to a predetermined level, as previously described.

A fuel-door closure condition detector 28 may be operatively connected to the controller. The closure condition detector 28 is configured for detecting a closure condition of the fuel door. A "closure condition" of the fuel door may be either of a "fully-closed" or "not fully-closed" condition of the fuel door. The door may be considered fully closed when it is in a condition suitable for the door locking mechanism to be engaged to lock the door and maintain the door in a closed condition. In one embodiment, the closure condition detector 28 includes a switch or other electrical circuit configured to be closed when the fuel door is completely closed. The controller 14 then interprets closure of this switch or circuit as an indication that the fuel door is completely closed.

Alternatively, a sensor or any other suitable means for detecting complete closure of the fuel door may be employed. A first state of the sensor may be interpreted as indicating that the fuel door is fully closed, and a second state of the sensor may be interpreted as indicating that the fuel door is not fully closed. States of the sensor may include various output voltage levels, "on" and "off" states, or any other states which are distinct from each other so as to enable the different states to represent the "fully closed" and "not fully closed" conditions of the fuel door.

In one or more arrangements, the status indicating system 10 can include one or more fuel door displays 30. The fuel-door display(s) 30 may be operatively coupled to the controller 14 and may be configured to provide, responsive to one or more signals from the controller 14, an indication as to whether and/or when the fuel door may be opened. The fuel door display(s) 30 may also be configured to provide, responsive to one or more signals received from the controller 14 after a fuelling operation, an indication as to whether or not the fuel door is completely closed.

A "display configuration" may be defined herein as a particular arrangement of symbols, lights and/or other indicia configured to convey to a viewer of the display configuration a specific message perceptible to the human sense of sight. A "display" may be defined as a physical embodiment of a display configuration, for example, as attached to a window or incorporated into a display face of a housing, as described herein.

Any display configuration described herein may be embodied in any suitable physical structure. For example, a display configuration can be embodied in the form of one or more light emitting diodes (LED) or any other suitable type of display. In embodiments described herein, the display 30 may be positioned at any location on the vehicle which is visible from an exterior of the vehicle to a user performing a fueling operation on the vehicle.

In embodiments described herein, the display 30 may be located as close as possible to the fuel door, to facilitate visibility of the display to a user during a fuelling operation. For example, in one embodiment (shown in FIGS. 5 and 5A), the fuel door display may be incorporated into (or attached to an interior face of) a rear window of the vehicle adjacent a "C"-pillar or rear-most vehicle pillar. In a particular embodiment, the display is attached directly to the rear window.

In another embodiment (shown in FIG. 9), the fuel door display may be located in or on a forward-most (i.e., closest to a front of the vehicle) portion of a housing for the vehicle taillights. The actual location of the fuel door display on any given vehicle may depend on such factors as the locations of the rear window, the taillight housing, and/or any other feasible placement locations in relation to the fuel door, for a particular vehicle design. The actual location of the fuel door display on any given vehicle may also depend on the structure of the display, the amount of space available for display configuration, and other pertinent factors.

Figure 2:
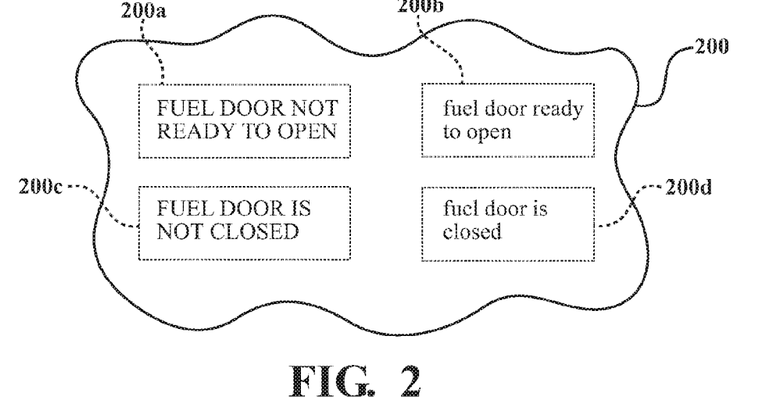
FIG. 2 shows a schematic view of a display configuration in accordance with an embodiment described herein.

FIG. 2 shows one embodiment 200 of a display configuration. Any display configuration described herein (for example, configuration 200) may have characters (words, numbers, other symbols, etc.) formed thereon for conveying to a user one or more desired message(s). The display configuration may have multiple display fields with each field displaying a different message. The display configuration may be structured so that light from an associated light source backlights or illuminates the characters in a desired color (or surrounds characters formed in dark print) in a known manner when the light source is powered.

The display configuration 200 shown in FIG. 2 has fields 200a, 200b, 200c and 200d, which each field displaying a different message. One field 200a is configured to convey the message that "the fuel door is not ready to open". Another field 200b is configured to convey the message that "the fuel door is ready to open". Another field 200c is configured to convey the message that "the fuel door is not closed". Another field 200d is configured to convey the message that "the fuel door is closed". Alternative text or characters may be used. Also, other arrangements of fields may be used. The messages 200a and 200c are intended to convey a warning (i.e., that the fuel door is not fully closed) or to prevent a user from acting in a certain way (i.e., trying to open the fuel door before the indicating system indicates that the fuel system has been depressurized). Thus, these message fields may be illuminated in (or by) red light. The messages 200b and 200d are intended to convey to the user that a certain action may be performed (i.e., opening of the fuel door) or that a desired condition has occurred (i.e., that the fuel door has been fully closed after refueling). Thus, these message fields may be illuminated in (or by) green light.

Figure 4:
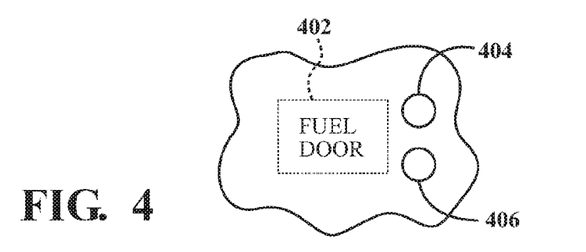
FIG. 4 shows a schematic view of another display configuration in accordance with an embodiment described herein.

FIG. 4 shows another embodiment 400 of a display configuration. In FIG. 4, the text 402 ("fuel door") is provided and configured to be visible to a user viewing the display configuration in most or all ambient lighting conditions. This text is provided to indicate to the user what vehicle feature the lights relate to. First and second colored illumination fields 404 and 406 are also provided to serve as "go" and "no go" indicators. The colored fields may be provided by, for example, suitably colored LED's in a manner known to those skilled in the pertinent art. For example, field 404 may be illuminated in green when a known next course of action is desired or approved, and field 406 may be illuminated in red to indicate that a known next course of action should not yet be executed. One or the other of fields 404 and 406 may be illuminated, but not both at once.

Figure 5:
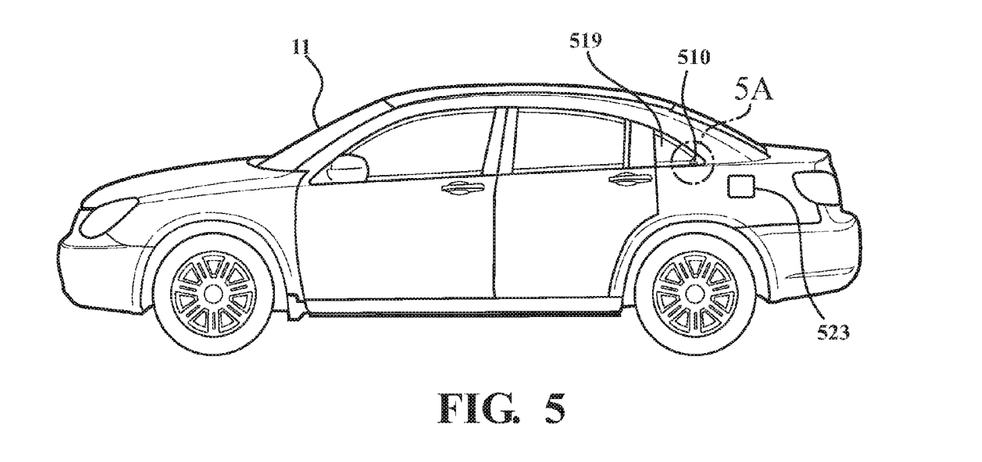
FIG. 5 shows a side view of a vehicle incorporating a display in accordance with an embodiment described herein.
Figure 5A:
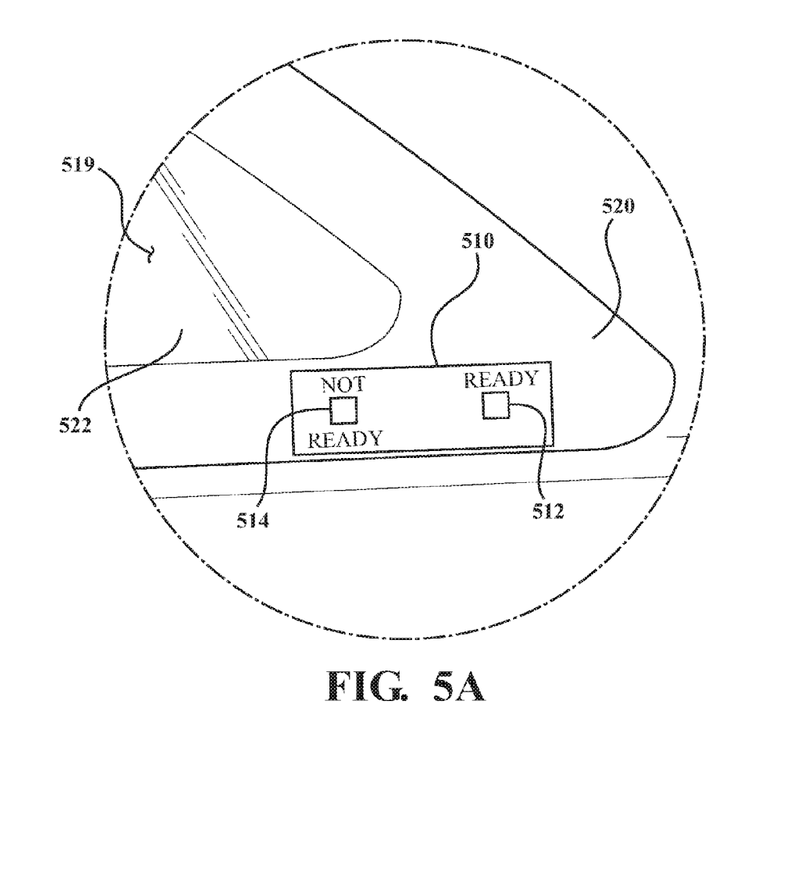
FIG. 5A is a magnified view of a portion of the vehicle shown in FIG. 5.

FIGS. 5 and 5A show another embodiment of a display configuration 510 similar to the configuration shown in FIG. 4. A first colored field 512 (labeled "READY") may be illuminated in green when a known next course of action is desired or approved, and a second colored field 514 (labeled "NOT READY") may be illuminated in red to indicate that a known next course of action should not yet be executed. The colored fields may be provided by, for example, suitably colored LED's in a manner known to those skilled in the pertinent art. Numerous other arrangements of symbols and colors are contemplated.

Figure 3:
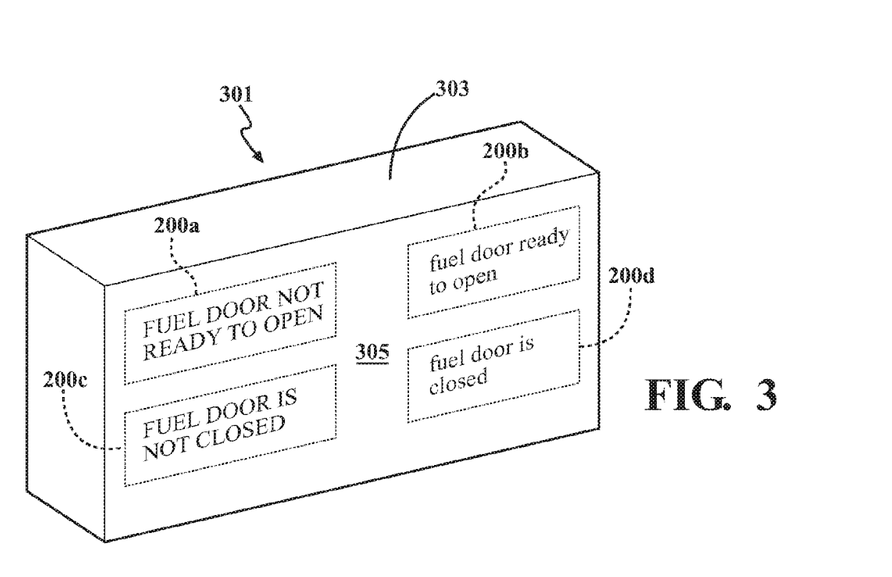
FIG. 3 shows a perspective view of a housing incorporating a display in accordance with an embodiment described herein.

Any display configuration described herein may be embodied in any suitable physical structure suitable for the purposes described herein. Referring to FIG. 3, in one embodiment, the display is embodied in a block 301 including a housing 303 with a display face 305 having a desired display provided thereon. FIG. 3 shows a perspective view of the display block 301. The housing 303 may be formed from any suitable material or materials, for example, a polymeric or ceramic material. The housing 303 may contain therein one or more light sources and associated wiring, circuitry, circuit boards and/or control components needed to convey power to the lights sources. The light source(s) (not shown) may be any suitable light source(s), for example LED's. The light source(s) may be structured and/or configured to generate light in at least two different colors. In a particular embodiment, the colors are red and green. In particular embodiments, the circuitry may be configured to make the light sources flash on and off, for attracting the attention of a user and/or for emphasizing the massage illuminated by the light source(s).

The housing 303 may also contain internal walls or partitions (not shown) if needed to prevent light of a first color from illuminating characters which are intended to be illuminated by light of a second, different color. For example, if one message displayed on the display face 305 is to be illuminated in green light so that the user sees green, an internal wall in the housing may provide a barrier preventing the internally-generated green light from illuminating a second adjacent message on the display face which is intended to be displayed in red. Display face 305 may be formed from a translucent or transparent material, with the characters painted or otherwise provided on the display face. Any arrangement of materials and structures may be provided which illuminates the characters in the desired manner. Any of the display configurations described herein may be implemented with or without a housing, as described above.

FIGS. 5 and 5A show a display configuration previously described incorporated into (or attached to an interior face of) a rear window 519 of the vehicle 11 adjacent a "C"-pillar or rear-most vehicle pillar. In a particular embodiment, the display is attached directly to the rear window 519. In the vehicle design shown in FIG. 5, the window 519 is located above the fuel door 523. The components forming the display (for example, LED's, symbols) may be applied to the window and/or arranged to provide the desired display configuration. A portion of the ceramic paint 520 conventionally applied along edges of some windows (to form a border around window clear portion 522) may be omitted or removed to permit application of desired text and/or symbols to the window surface. If desired, the display configuration and components may be concealed behind or under vehicle trim, molding or other interior features (for example, under or inside the paneling located behind the vehicle rear seats).

In a particular embodiment, a cavity (not shown) may be formed in a portion of the window residing within the vehicle interior. The cavity may be configured to accommodate the elements of the display.

In a particular embodiment, symbols conveying the desired message are painted in ceramic paint directly on a face of the window facing an interior of the vehicle. These symbols may then be backlit or otherwise illuminated by suitably-positioned LED's or other light sources.

Figure 9:
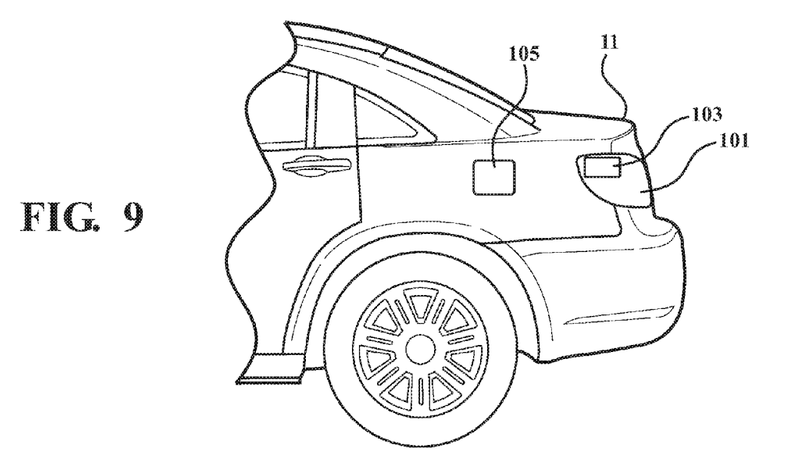
FIG. 9 shows a side view of a portion of a vehicle incorporating a display in accordance with another embodiment described herein.

FIG. 9 shows another possible location for a display in accordance with an embodiment described herein. In this embodiment, the fuel door display 103 is located in or on a forward-most (i.e., closest to a front of the vehicle) portion of a housing 101 structured for enclosing and protecting the vehicle taillights. The display 103 may be positioned at a location within (or on) the housing 101 closest to the fuel door 105, to enhance the visibility of the display during fueling.

The display(s), sensors, and other mechanisms configured to operate when the vehicle engine is turned off may be powered, for example, by the vehicle battery or any other suitable power source.

Figure 6:
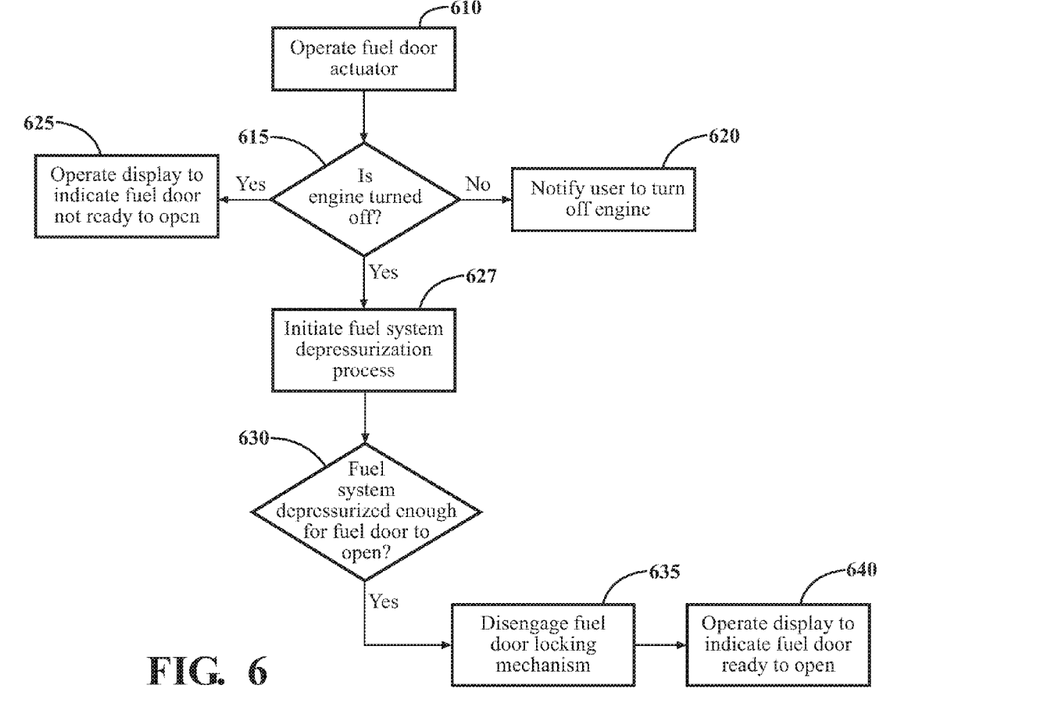
FIG. 6 is a flow diagram illustrating operation of one aspect of an embodiment of the status indicating system.

Referring to FIG. 6, operation of the status indicating system embodiment shown in FIG. 1 will now be described. Controller 14 is operatively connected to the system elements as shown and configured for controlling and coordinating operations of the system elements as described herein.

In block 610, a user operates the fuel door actuator, indicating that the fuel door is to be opened.

In block 615, responsive to the indication that the user wants to open the fuel door, the controller verifies that the engine is shut off. If the engine has not been turned off, in block 620 a message is generated and provided (via the HMI interface 15, for example) that the engine has not been shut off. This message may be continuously displayed or repeated until the engine is turned off. If the engine has been turned off, the process proceeds to blocks 625 and 627.

In block 625, the display may be operated by the controller 14 to indicate that the fuel door is not ready to open. In a display embodiment such as that shown in FIG. 4, this indication may be in the form of a powered red LED (such as light 406, for example). Because the fuel door has not been opened yet and the fuelling operation has not been performed, this indication may be understood by a user to mean that the fuel door is not ready to open, even though there is no text indicating this meaning included in the display configuration. Simultaneously with the operation of the display in block 625, in block 627, the controller initiates a fuel system depressurization process.

After initiation of the fuel system depressurization process, in block 630, the controller initiates constant monitoring of the pressure sensor(s) 18 to detect when the fuel system pressure falls to a level at or below the predetermined threshold deemed necessary before the fuel cap can be removed. The pressure sensor(s) will be monitored continuously until the pressure reaches (or falls below) the threshold level. Alternatively, the pressure sensor(s) may be configured to transmit signals containing pressure information as rapidly as pressure readings can be acquired. The indicating system is configured to detect, as rapidly as possible, when the fuel system pressure reaches or falls below the threshold level.

In block 635, as soon as it is detected that the fuel system pressure reaches or falls below the threshold level, the controller 14 operates the fuel door locking mechanism 26 to release or deactivate the locking mechanism. This enables the fuel door to be opened, either automatically or manually by a user.

In block 640, after deactivation of the locking mechanism 26, the controller 14 may operate the display to indicate that the fuel door is ready to open. In a display embodiment such as that shown in FIG. 4, this indication may be in the form of a powered green LED (such as light 404, for example).

Figure 7:
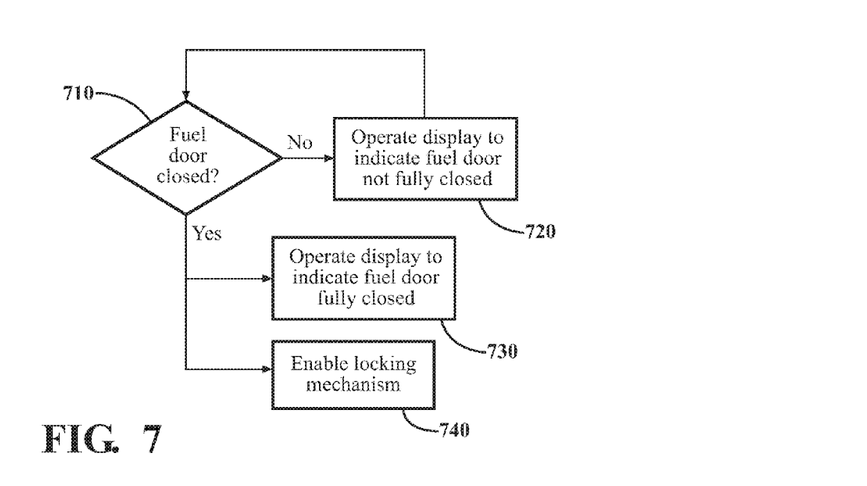
FIG. 7 is a flow diagram illustrating operation of another aspect of an embodiment of the status indicating system.

Referring now to FIG. 7, after fueling, the user may close the fuel door. If the door is not fully closed, the fuel door closure detector 28 will register that the door is not fully closed. Responsive to this, in block 720, the controller 14 will operate the display to indicate that the fuel door is not fully closed. In a display embodiment such as that shown in FIG. 4, this indication may be in the form of a powered red LED (such as light 406, for example).

Because the fuel door was previously been opened, the fuelling operation has been performed, and an attempt has been made to close the fuel door, this indication may be understood by a user (from prior instruction, for example) to mean that the fuel door is not fully closed, even though there is no text indicating this meaning included in the display configuration. Responsive to this indication, the user may make another attempt to close the door.

In block 730, when the door is fully closed, the controller 14 may operate the display to indicate that the door is fully closed. In a display embodiment such as that shown in FIG. 4, this indication may be in the form of a powered green LED (such as light 404, for example). Simultaneously with the operation of the display in block 730, the controller (in block 740) may re-enable or re-engage the fuel door locking mechanism so that the fuel door may be locked in the fully closed position. Disablement of the locking mechanism prior to full closure of the door may aid in preventing damage to the locking mechanism.

The system may be configured to turn off the display (so that no indications are generated) for example, after the engine is started or at another time after the refueling process.

Figure 8:
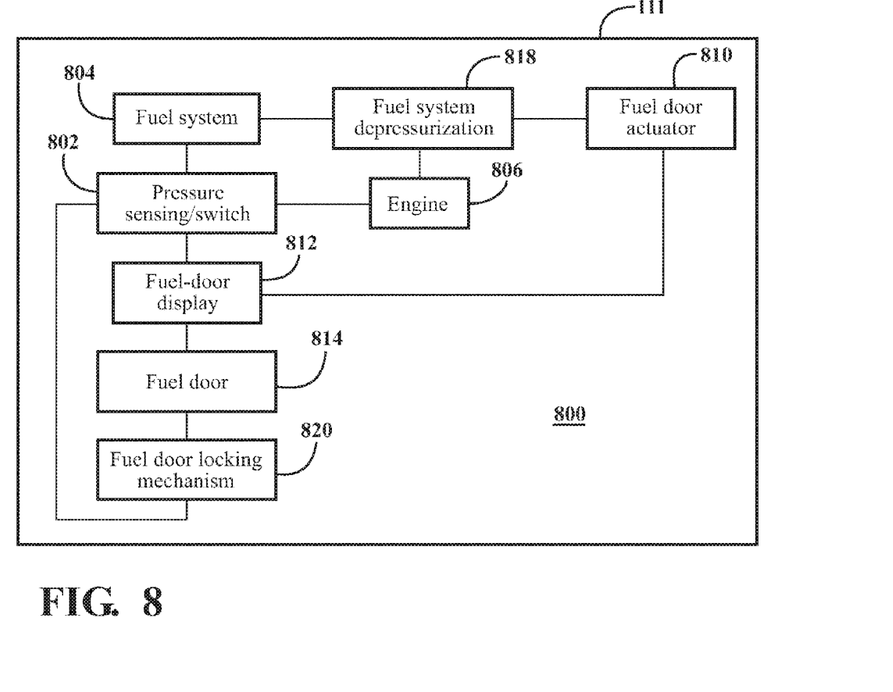
FIG. 8 shows a schematic representation of a vehicle incorporating a fuel-door status indicating system in accordance with another embodiment described herein.

FIG. 8 shows operative connections between elements of an alternative embodiment of a fuel door status indicating system incorporated into a vehicle 111. This embodiment of the system may be implemented without the controller described in relation to the previously described embodiment.

In this embodiment, the various elements of system 800 may be connected by various electrical circuit elements and/or arrangements thereof, and/or may also incorporate circuit elements and/or arrangements thereof. The following descriptions of system 800 and the elements of system 800 will be understood to include any additional components (such as capacitors, diodes, switches and/or other electrical circuit components and/or devices) necessary for the performance of the functions described therein. One skilled in the pertinent art could, given the functions and operations described herein, design and/or construct a system including the circuitry necessary to perform the functions and operations set forth in the description. Unless otherwise described herein, elements of system 800 described below are similar in function to the elements shown in FIG. 1 and previously described.

Fuel door actuator 810 is operatively connected to other elements of the system 800 as shown. The system 800 is configured so that operation of the fuel door actuator 810 by a user (after the engine has been shut off) automatically initiates a fuel system depressurization process. In a particular embodiment, the fuel door actuator 810 may be prevented from operating (by a suitable conditional locking mechanism, for example) when the engine is turned on. The fuel system pressure may be reduced or relieved in a manner known in the art, after shutting off the engine 806 and operating the fuel door actuator 810. For example, a suitable pressure relief valve or other mechanism may be used. In most or all cases, the fuel system 804 will remain pressurized until the engine 806 is off and the fuel door actuator 810 has been operated by a user. Operation of the fuel door actuator 810 also triggers a switch or other mechanism (not shown) which operates the display 812 to indicate that fuel door 814 is not ready to be opened. This display mode is maintained until the pressure switch 802 (described below) closes to indicate that the pressure has fallen to or below the desired threshold.

Referring to FIG. 8, a fuel system pressure sensing mechanism 802 may be in the form of a conventional pressure switch adapted for operating as described herein. Although described herein as a pressure switch, element 802 may be in the form of any other component or group of components suitable for performing the functions described herein. Switch 802 is operatively connected to the fuel system 804 for detecting the pressure in the fuel system. Switch 802 is configured to close (1) after the vehicle engine 806 has been turned off; (2) after operation of the fuel door actuator 810 by a user, and (3) after the fuel system pressure has fallen to a predetermined level at or below which the fuel cap may be removed.

The system is configured such that closure of switch 802 switches the display mode of display 812 to a mode indicating that the fuel door is ready to be opened. The system shown in FIG. 8 is also configured so that closure of switch 802 disables or otherwise deactivates the fuel door locking mechanism 820, thereby allowing the door to be opened. In addition, the system is configured such that opening of the fuel door 814 breaks or closes a circuit (not shown) or otherwise starts a timing mechanism (not shown) configured to switch the fuel door display 812 mode to a mode indicating that the fuel door 814 is not fully closed, after passage of a predetermined time period. This enables a user to begin refueling prior to switching of the display to the "door not closed" mode. The system 800 is configured so that the display 812 remains in this mode until the fuel door is fully closed.

After fueling is complete, the user may close the fuel door 814. The system 800 is configured such that full closure of the fuel door 814 after the door has been opened activates a switch (or other mechanism), opens a switch, or otherwise operates to change the display mode of display 812 to a mode indicating that the fuel door is fully closed. The system is also configured such that full closure of the fuel door the door has been opened automatically activates the fuel door locking mechanism, which proceeds to lock the fuel door in the fully closed condition. The system is configured such that, if the fuel door does not fully close, the display remains in a mode indicating that the fuel door is open. In addition, the system is configured such that, if the fuel door does not fully close, the fuel door locking mechanism remains disabled or deactivated.

Figure 10:
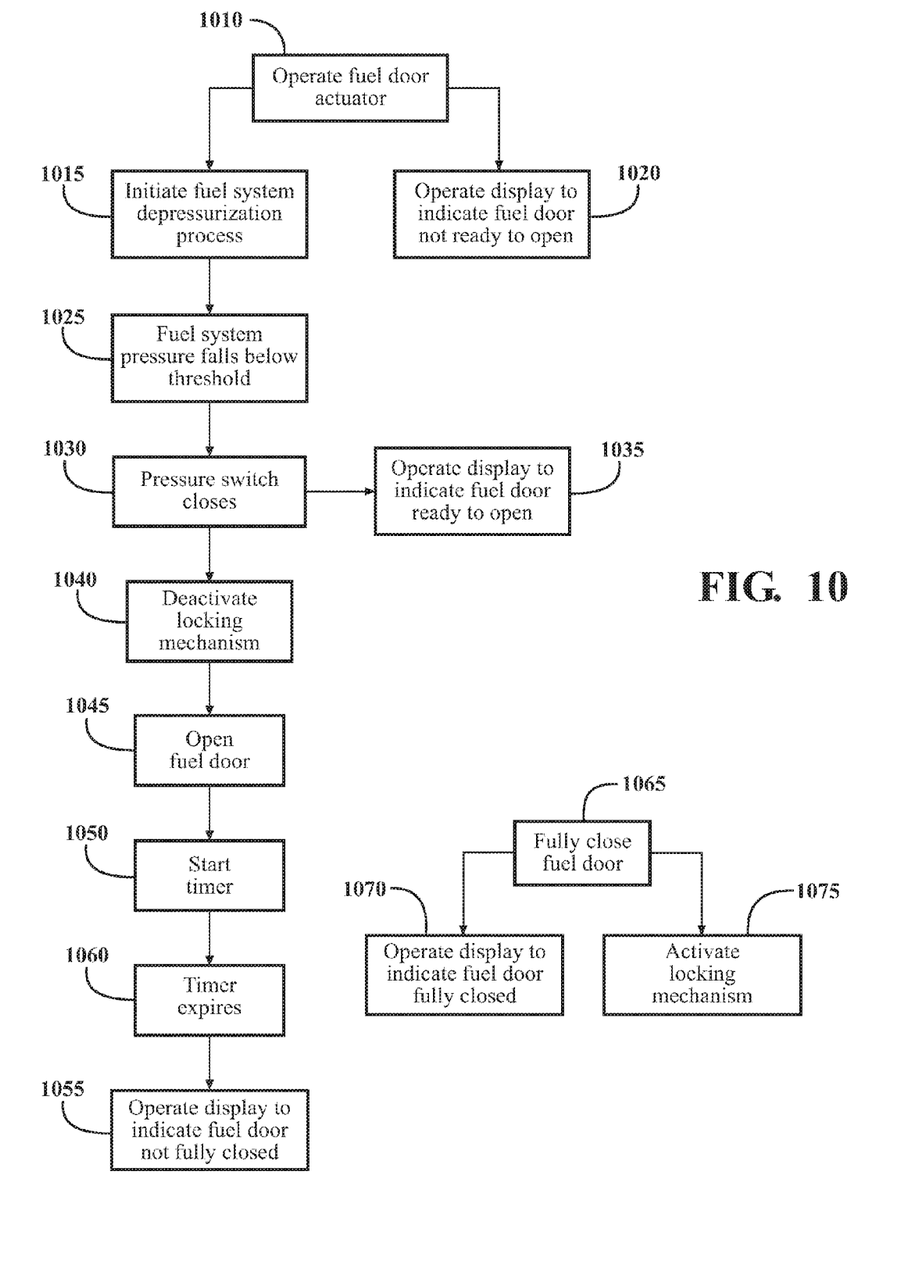
FIG. 10 is a flow diagram illustrating operation of a status indicating system in accordance with another embodiment described herein.

FIG. 10 illustrates operation of the embodiment shown in FIG. 8. Referring to FIG. 10, in block 1010, a user may operate the fuel door actuator 810. Operation of the fuel door actuator 810 initiates (in block 1015) the fuel system depressurization process.

In block 1020, simultaneously with initiation of the fuel system depressurization process, the fuel door display is operated to indicate that the fuel door is not ready to open.

At some point during depressurization, the fuel system pressure falls to a level at or below the threshold level (block 1025). After the fuel system pressure falls to a level at or below the threshold level, in block 1030, the pressure switch 802 closes. This causes (in block 1035) the display to be operated to indicate that the fuel door is ready to open. Also, in block 1040, closure of the switch 802 (FIG. 8) deactivates the fuel door locking mechanism 820, thereby enabling opening of the fuel door (in block 1045). Opening of the fuel door starts the timing mechanism (not shown) configured to change the display after passage of a predetermined time period.

After passage of the time period (in block 1060), the display is operated to indicate that the fuel door is not fully closed. This indication is displayed as long as the fuel door remains open (i.e., not fully closed), both during and after fuelling.

In block 1065, the fuel door is fully closed. This causes (in block 1070) the display to be operated to indicate that the fuel door is fully closed. Full closure of the fuel door also causes (in block 1075) the fuel door locking mechanism to be engaged, thereby locking the fuel door.

The flow diagrams and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A fuel door status indicating system for a pressurized fuel system, the status indicating system comprising:
    pressure sensing means configured to measure a pressure in the fuel system;
    a controller operatively connected to the pressure sensing means and configured to compare a measured fuel-system pressure with a predetermined pressure; and
    a display operatively connected to the controller and configured to provide an indication as to whether a fuel door may be opened, the display being located along a side of a vehicle at a level above the fuel door,
    wherein the controller is configured to control operation of the display to provide the indication responsive to the comparison of the measured pressure with the predetermined pressure.

2. The system of claim 1 wherein the system further comprises fuel-door closure detection means operatively connected to the controller, the detection means being configured for detecting a closure condition of the fuel door; and
    a display configured to provide an indication as to whether the fuel door is fully closed,
    wherein the controller is configured to control operation of the display to provide the indication responsive to the closure condition of the fuel door.

3. The system of claim 2 wherein the system further comprises a fuel door locking mechanism operatively connected to the controller, and wherein the controller is configured to control operation of the locking mechanism responsive to the closure condition of the fuel door, both prior to a fueling operation and after a fueling operation.

4. A vehicle including a fuel door status indicating system in accordance with claim 1.

5. The system of claim 1 wherein the display is positioned so as to be visible through a rear side window of the vehicle adjacent a rear-most pillar of the vehicle.

6. The system of claim 1 wherein the system further comprises a display operatively connected to the fuel door and configured to provide an indication as to whether the fuel door is fully closed; and
means, responsive to full closure of the fuel door, for operating the display to provide the indication that the fuel door is fully closed.

7. The system of claim 6 wherein the system further comprises a fuel door locking mechanism operatively connected to the fuel door, and means for, responsive to full closure of the fuel door, operating the locking mechanism to lock the fuel door.

8. A fuel door status indicating system for a pressurized fuel system, the status indicating system comprising:
pressure sensing means configured to measure a pressure in the fuel system;
a controller operatively connected to the pressure sensing means and configured to compare a measured fuel-system pressure with a predetermined pressure; and
a display operatively connected to the controller and configured to provide an indication as to whether a fuel door may be opened, wherein the display is located in or on a forward-most portion of a housing for vehicle taillights and is separate and independent from the vehicle taillights, and wherein the display is also located along a rear portion of a side of the vehicle where the fuel door is located.

9. A fuel door status indicating system for a pressurized fuel system, the status indicating system comprising:
pressure sensing means configured to measure a pressure in the fuel system; and
a display operatively connected to the pressure sensing means and configured to provide an indication as to whether the fuel door may be opened,
wherein the system is configured such that the display is operated to indicate that a fuel door is ready to open, responsive to a shutting off of the vehicle engine, operation of a fuel door actuator by a user, and detection of a predetermined pressure in the fuel system by the pressure sensing means, and wherein the display is located adjacent a rear-most pillar of the vehicle on a side of the vehicle where the fuel door is located.

10. The system of claim 9 wherein the system is configured such that the display is operable without a controller.

11. A vehicle including a fuel door status indicating system in accordance with claim 9.

12. A fuel door status indicating system for a pressurized fuel system, the status indicating system comprising:
pressure sensing means configured to measure a pressure in the fuel system; and
a display operatively connected to the pressure sensing means and configured to provide an indication as to whether the fuel door may be opened,
wherein the system is configured such that the display is operated to indicate that the fuel door is ready to open, responsive to a shutting off of the vehicle engine, operation of a fuel door actuator by a user, and detection of a predetermined pressure in the fuel system by the pressure sensing means, wherein the system is configured such that the display is operable without a controller, and wherein the system is configured so that opening of the fuel door starts a timing mechanism configured to operate a fuel door status display to, after passage of a predetermined time period, display a message indicating that the fuel door is not fully closed.

13. The system of claim 12 wherein the system further comprises means for, after the shutting off of the vehicle engine and operation of a fuel door actuator by the user, but prior to detection of the predetermined pressure in the fuel system by the pressure sensing means, operating the display to indicate that the fuel door is not ready to open.

14. The system of claim 12 wherein the system is configured to operate the display to display the message indicating that the fuel door is not fully closed, until the fuel door is fully closed.

15. A method of providing an indication as to a status of a fuel door of a vehicle incorporating a pressurized fueling system, comprising steps of:
providing a display configured to provide an indication as to whether the fuel door may be opened, the display being located adjacent a rear-most pillar of the vehicle, along a side of the vehicle at a level above the fuel door;
determining a pressure within the fuel system;
comparing the fuel system pressure to a predetermined threshold pressure; and
responsive to the fuel system pressure being at or below the predetermined threshold pressure, operating the display to indicate that the fuel door may be opened.

16. The system of claim 15 further comprising the step of, responsive to the fuel system pressure being above the predetermined threshold pressure, operating the display to indicate that the fuel door may not be opened.

17. The system of claim 15 further comprising the steps of detecting a closure condition of the fuel door; and
responsive to the closure condition, operating a display to provide an indication of the closure condition.

* * * * *